Sept. 17, 1940.  E. D. TILLYER  2,214,802
POLARIZING RETINOSCOPE
Filed Nov. 22, 1937  2 Sheets-Sheet 2
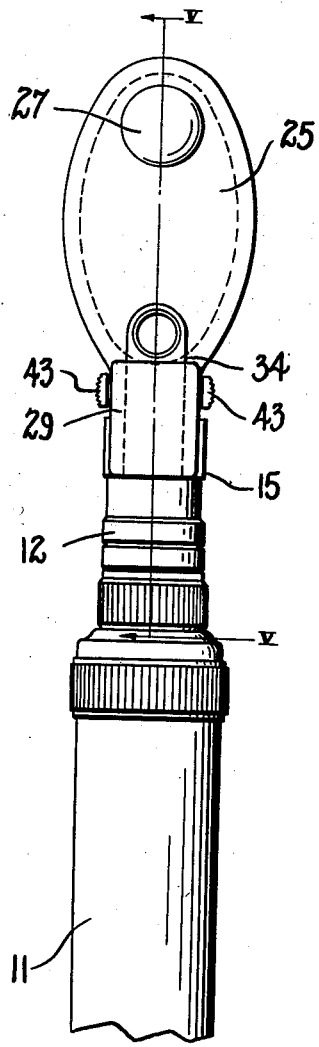
Fig. IV
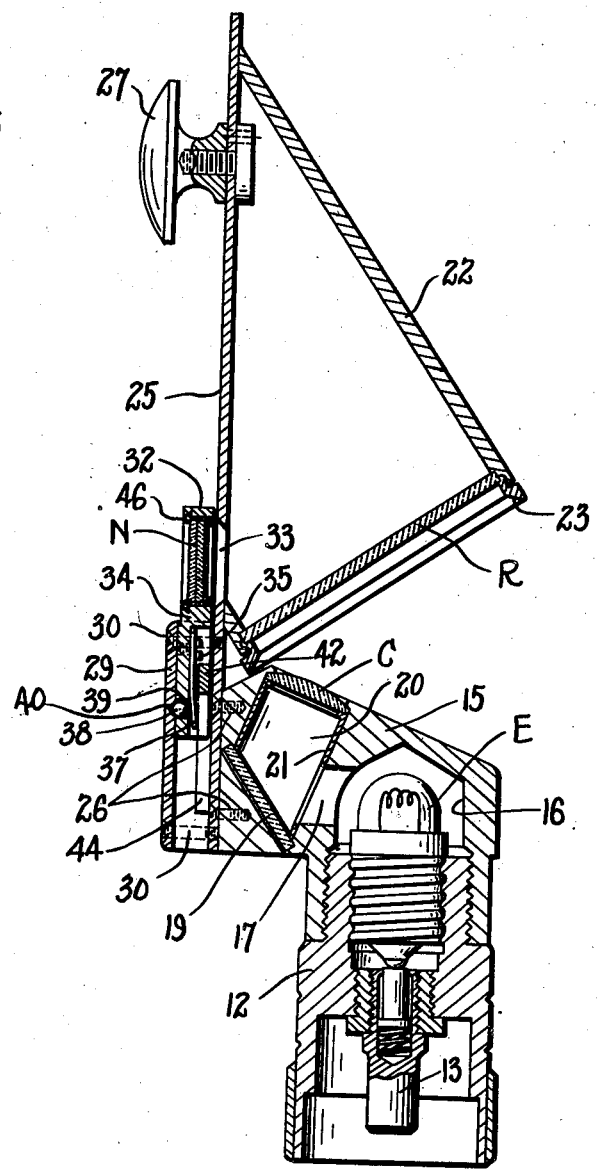
Fig. V
INVENTOR
EDGAR D. TILLYER
BY
Harry H. S—
ATTORNEY Patented Sept. 17, 1940

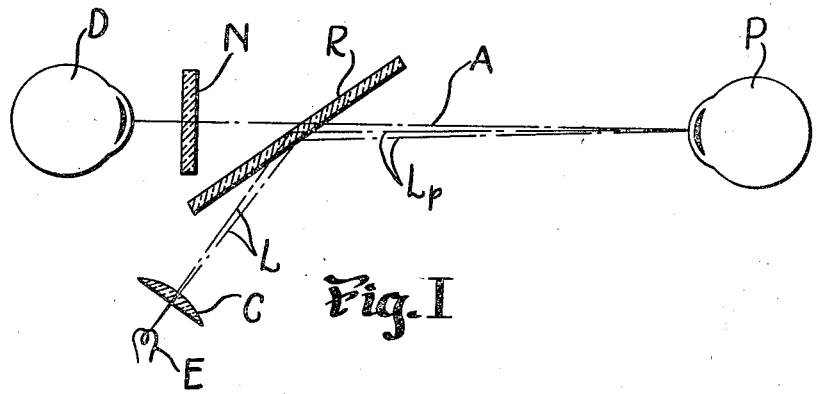
Fig. I
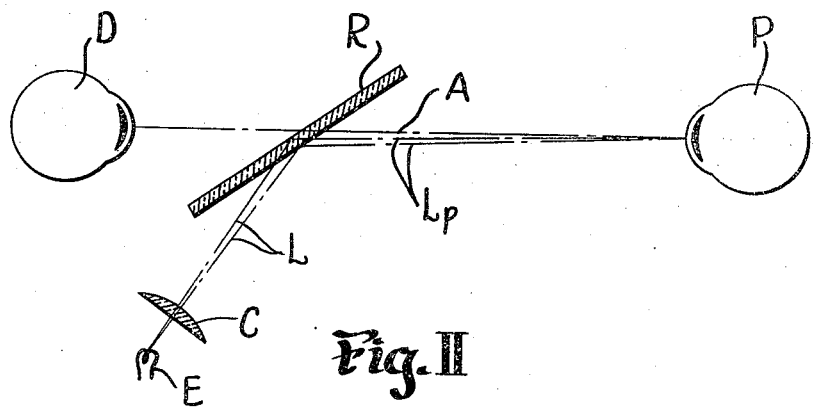
Fig. II
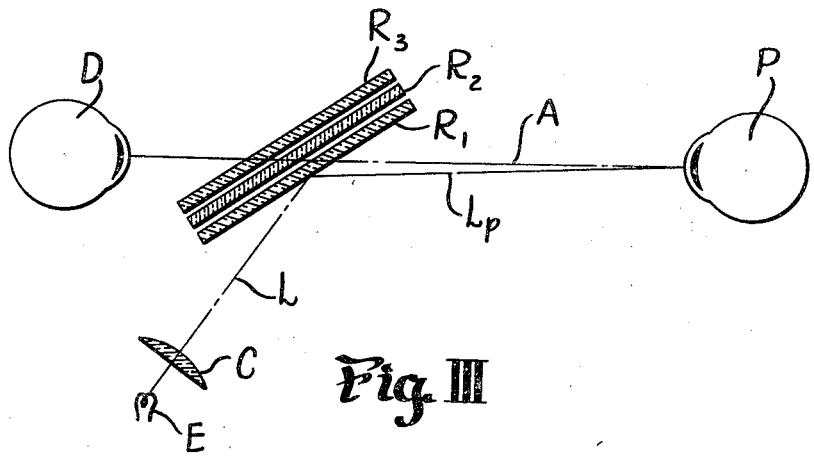
Fig. III

2,214,802

UNITED STATES PATENT OFFICE 2,214,802

POLARIZING RETINOSCOPE

Edgar D. Tillyer, Southbridge, Mass., assignor to American Optical Company, Southbridge, Mass., a voluntary association of Massachusetts Application November 22, 1937, Serial No. 175,865

4 Claims. (Cl. 88—20)

This invention relates to an eye examining instrument, and more particularly to an instrument which will project a beam of light into the interior of the eye for diagnostic purposes.

The examination of the eyes was formerly handicapped by annoying reflexes from the anterior surfaces of the cornea. The best method yet known for avoiding this difficulty is by polarization of the light which is directed into the eye, using an analyzer to eliminate the light which is reflected from the anterior surface of the cornea. Of course, any diffuse light is not blocked out by the analyzer, so that the retina and other surfaces which do not directly reflect the polarized light can be viewed without hindrance from the annoying reflexes from the reflecting surface of the cornea.

An object of the invention is to provide a diagnostic instrument which projects a beam of polarized light into the eye of the patient, without the use of Nicol prisms or similar devices.

Instruments which have been used for this purpose heretofore, have required that the light emanating from the light source be passed through a Nicol prism, or some similar device, thereby adding substantially to the cost of the instrument. Moreaver, the capacity of the instrument to project light into the eye of the patient is limited by the characteristics of the polarizing device, such as the Nicol prism. This prism may be of such restricted area as to limit the amount of light which can be passed through the same.

A further disadvantage of a Nicol prism, or similar device, is that its inefficiency in transmitting light cuts down the available illumination for the surfaces which are to be observed. The best polarizing devices available cut down the effective illumination to substantially less than half. This, together with the loss at the transparent mirror, which customarily is included as a part of the diagnostic instrument, reduces the available illumination for the surfaces to be examined until the matter of sufficient illumination is a real problem.

The advantage afforded by the present invention in the way of increased illumination for the benefit of the observer will be pointed out in connection with the description of the embodiments of my invention illustrated in Figs. I, II, and III of the drawings. In each of these embodiments, there is a light source shown as the filament of an electric lamp E. It is, of course, advantageous to concentrate the light from this source; and I have illustrated at C a condensing lens for directing approximately parallel (or slightly divergent) rays of light upon the partially transmissive means R (or $R_1$, $R_2$, and $R_3$ in Fig. III). Accordingly, a beam of light is directed into the eye P of the patient.

The line of sight A from the eye D of the Examiner, passes through the partially transmissive means R into the eye P (the light, of course, passes in the opposite direction from that given). In the embodiment illustrated in Fig. I, a device N is used, which has such polarizing effect upon this returning light as to function as an analyzer, and eliminate the annoying reflexes from the anterior surface of the cornea.

In accordance with my invention, I project polarized light into the eye of the patient by directing light from a light source upon the reflecting surface of partially transmissive means having this reflecting surface arranged with the angle of incidence substantially equal to the polarizing angle.

In the accompanying drawings which illustrate my invention:

Fig. I is a diagrammatic view illustrating one embodiment of my invention according to which a beam of light from the light source is reflected by a single sheet of glass into the eye of the patient and the observer makes his examination by looking through a device having such polarizing effect upon the returning light as to function as an analyzer;

Fig. II is a similar view of a second embodiment of my invention in which this polarizing device is omitted and the sheet of glass itself functions as the analyzer;

Fig. III is a similar view of a third embodiment of my invention, in which a plurality of glass sheets are employed for increasing the polarizing effect on the light emanating from the light source;

Fig. IV is a view in elevation from the Examiner's side of a diagnostic instrument embodying my invention; and Fig. V is a view in vertical section on the line V—V of Fig. IV.

I find a sheet of glass to be suitable for the partially transmissive means R. The beam of light indicated by the line L, which is thrown upon the sheet of glass R, is preferably of the character usually provided by diagnostic instruments of this character. This light falling upon the inclined surfaces of the sheet of glass R is separated by these reflecting surfaces into two portions. One portion passes on through. The portion which passes along the line L*p* is almost completely polarized. The other portion is partially polarized; but as it is not used, we are not concerned therewith. The beam of light L*p*, which falls upon and into the eye of the patient P, is the light which illuminates the surfaces to be observed. With the surfaces of the sheet R clean, and with the angle of incidence of the beam L substantially equal to the polarizing angle, a maximum portion of this light is directed, as polarized light L*p*, toward the surfaces of the eye to be examined. By polarizing the light L in this manner with partially transmissive means, the portion of the light which is made available for illumination is relatively high.

It will be understood that the above mentioned angle of incidence should be substantially equal to the polarizing angle which will depend upon the index of refraction of the sheet R; and that accordingly this angle will vary slightly, depending upon the type of material used for the partially transmissive means. As shown, this angle is about 66½°.

It will be apparent, then, that a portion of the light in the beam L has been directed by the surfaces of the sheet R in a polarized condition, along the line indicated as L*p* in Fig. I; and that this polarized light is employed in this diagnostic instrument for illuminating the surfaces to be observed. As this light in a diffused condition returns from the retina through the partially transmissive means R, it is again divided into a polarized portion which is reflected and lost, and into a portion which goes on through to the eye D of the observer. It is this latter portion which presents to the eye D the picture or image of the surfaces which are being examined. But other than this diffuse light, is also directed along the axis A. As above mentioned, there are objectionable reflexes from the anterior surface of the cornea. This is all polarized light, since it is a direct reflection of the polarized light of the beam L*p*. Moreover, this polarized light is polarized in a single plane. Accordingly an analyzer, if properly arranged and constructed, will eliminate this polarized light.

In the embodiment shown in Fig. I, I employ a device N which has such polarizing effect upon the returning light A, as to function as an analyzer. This device N may be a Nicol prism, or it may be a sheet of cellulose acetate film, containing minute crystals arranged in parallel formation, these crystals being so oriented as to polarize the light in the desired plane. This type of material is sold under the trade-mark Polaroid. Before the instrument is put into use, this device N is oriented so as to block out the polarized light reflected along the axis A.

In the embodiment shown in Fig. I, therefore, we have high efficiency of illumination of the surfaces of the eye P with polarized light; and in the line of sight to the eye D of the examiner has been inserted an analyzer N, which prevents any substantial amount of polarized light from entering the eye of the observer.

The polarizing device N, of course, cuts down the amount of light transmitted to the eye D at least one-half. Such devices are so efficient in their polarizing effect that their use is desirable, provided there is enough light in the first place, so that even when cut down more than one-half, the observer is able to see clearly the surfaces he is examining. At the expense of some annoyance from the above mentioned reflexes, it is possible to do away with the device N; and Fig. II of the drawings illustrates my invention with such omission of the device N. The omission of the device N leaves the function of anayzer to the sheet R. The angle of incidence of the polarized light passing along the axis A upon the sheet R is substantially the polarizing angle. Not all of this polarized light traveling toward the eye D is reflected by the sheet R, however. Accordingly, there is balanced against the increased amount of light entering the eye D, the annoyance of a substantial amount of polarized light passing through the sheet R instead of being deflected.

In the embodiment illustrated in Fig. III, a plurality of sheets R₁, R₂ and R₃, of partially transmissive means are employed, instead of the single sheet R. As the rays of light are directed from the source E upon these sheets R₁, R₂, and R₃, each surface acts in the manner above pointed out, namely, to separate the rays of light into a portion which is polarized and reflected, and a portion (also polarized) which passes on through. The added effect of the four surfaces of the added sheets R₂ and R₃, means an augmented beam L*p* for illuminating purposes.

At the same time, the returning light along the axis A passes through three sheets. This means that each of these sheets functions as an analyzer, and the cumulative effect of the three sheets is sufficient to cut down the annoyance from reflection of polarized light to a point where it can be disregarded. In the embodiment illustrated in Fig. III, therefore, the device N will ordinarily be omitted, although it may be employed to remove the last traces of reflected polarized light.

Against the advantage of the embodiment shown in Fig. III that there is increased efficiency both in the amount of polarized light directed toward the eye P and in the analyzing effect upon the reflected polarized light, there is balanced the susceptibility of this construction to infiltration of dirt between the sheets R₁, R₂, and R₃. The efficiency of such an arrangement, therefore, depends upon the willingness of the user to keep these surfaces clean. It will be understood that tiny particles of dust upon the surfaces of these sheets R₁, R₂, and R₃, have a bearing upon the efficiency of the instruments, as such tiny particles act upon polarized light to diffuse the same. It is important, therefore, that the surfaces of the partially transmissive means be clean.

Of the three embodiments I have selected for illustration in detail the first two embodiments and Figs. IV and V show in detail one form which these two embodiments may take.

A suitable source of current is disposed in the handle 11, the handle shown in the drawing being illustrative merely. For instance, a battery may be disposed in this handle 11; and as a further example, a transformer may be disposed therein. The light bulb E is threaded into a base 12 so as to be adjustable longitudinally of its axis, and current is supplied to this lamp E by electrical connection 13. A housing 15 is threaded on to the base 12, which is in turn mounted on the upper end of the handle 11, this housing 15 being provided with a chamber for accommodating the electric lamp E. The wall 16 of this chamber is preferably rendered dull black in any suitable manner so as not to give reflections.

Instead of directing the light from the lamp E immediately upon the partially transmissive means, I have retained the handle 11 and the electric lamp E in their conventional position, and provide a lateral passage 17 which permits the light from the lamp E to fall upon a reflecting mirror 19. This mirror is preferably of the front surface reflecting type, and is held in place in the light projection passageway 20 by a sleeve 21.

The light reflected by this mirror 19 passes along the projection passageway 20 and out through the condensing lens C. I have employed for this purpose a condensing lens of such focus that the light is directed as slightly divergent rays upon the partially transmissive means R. In the instrument shown in Figs. IV and V, this means R is a sheet of clear glass with polished surfaces. This sheet of glass R is held in the lower rim of a hood 22 by a retaining ring 23.

This hood 22 is fixed on the patient's side of a vertically disposed plate 25, with the axis of the hood at such an angle that the sheet of glass R, which is normal to this axis, receives the light emanating from the electric lamp E at the required angle of incidence, herein approximately the angle 66½°. The plate 25 is secured to the housing 15 by screws 26, and is provided with a knob 27 for resting against the brow of the observer.

A bracket 29 is secured to the base of the plate 25 by screws 30. The bracket 29 is hollow to provide a guideway for a slide 34, which accordingly can be raised and lowered. There is integral therewith, so as to move into and out of alignment with the sight opening 33 in the plate 25 a mount 32. A screw 35 in a slot in the lower portion of the slide 34 secures to the slide a leaf spring 37 so as to press against a ball 38 retained within a recess 39 extending through the portion of the slide 34. This ball drops into a slight depression 40 in the bracket 29 when the mount 32 is in alignment with the sight opening 33. A crossbar 42 disposed in a transverse slot in the slide 34 carries at its end knurled knobs 43 by which the slide 34 may be raised and lowered relative to the bracket 29. For this purpose slots 44 are provided in the two sides of the bracket 29.

The polarizing device N which serves as the analyzer is mounted in the upper portion 32 of the slide 34 and retained in its opening by a ring 46. It will be apparent from the construction illustrated and described that the polarizing device N may be moved into or out of alignment with the sight opening 33, so that the observer may use this analyzer or dispense with its use as he desires.

As previously mentioned, a portion only of the light directed upon the sheet of glass R is reflected to the eye of the patient. The portion which passes through the sheet R is of no use, and care should be taken to dissipate it as completely as possible. Accordingly, I coat the interior surface of the hood 22 with a shiny black paint, varnish, or the like. Whatever light is not absorbed by this shiny black surface is reflected against the opposed face of the plate 25. This opposed face I cover with a dull black covering, such as a coating of black paint without gloss. Whatever light is reflected by the inner surface of the hood 22 is to a large extent absorbed by this dull black surface of the plate 25.

Due to the oval cross section of the hood 22, the sheet of glass R is also oval instead of round, as is suitable for a reflecting surface arranged at this angle relative to the line of sight.

It will be apparent from the above description that I have provided a diagnostic instrument of this type which is relatively less expensive than similar instruments employing Nicol prisms or similar polarizing devices for polarizing the light directed upon the surfaces of the eye to be examined.

It will, furthermore, be apparent that by eliminating such a polarizing device between the source of illumination E, and the patient's eye, the amount of available illumination for the surfaces to be observed, has been increased.

While I have illustrated and described certain embodiments which my invention may assume, it will be understood that the invention may be otherwise embodied and practiced within the scope of the following claims.

I claim:

1. A diagnostic instrument which may be used in eye examination, said instrument having a head with a sight aperture portion for viewing the eye under examination, a transparent reflector supported on said head adjacent said sight aperture portion and with its reflecting surface lying in a plane so angularly disposed relative to the sight aperture portion as to afford a line of sight through said transparent reflector and sight aperture, a light source, means on said instrument for supporting the light source and for directing the light from said source to the reflecting surface at substantially the polarizing angle so that for the particular transparent medium used for said reflector the light will be polarized and will be directed substantially along the line of sight, transparent reflector and sight aperture portion being supported so that the reflector will also function as analyzing means the transparent reflector being positioned at the polarizing angle for the light reflected back from the eye under examination and passing along the line of sight through the transparent reflector and sight aperture whereby specular reflection from the cornea and lenses in front of the cornea of an eye under observation, returning substantially along said line of sight, will be reduced and diffused light coming from the inside of said eye will be transmitted to the eye of an individual using said instrument when the instrument is supported in its normal operating position.

2. A diagnostic instrument which may be used in eye examination, said instrument having a head with a sight aperture portion for viewing the eye under examination, a reflective unit comprising a plurality of contiguous transparent reflectors supported on said head adjacent said sight aperture portion and with the reflective surfaces thereof lying in planes so angularly disposed relative to the sight aperture portion as to afford a line of sight through said transparent reflectors and sight aperture, a light source, means on said instrument for supporting the light source and for directing the light from said source to the reflecting surfaces at substantially the polarizing angle so that for the particular transparent medium used for said reflectors the light will be polarized and will be directed substantially along the line of sight, the transparent reflectors and sight aperture portion being supported so that the reflectors will also function as analyzing means, the transparent reflectors being positioned at the polarizing angle for the light reflected back from the eye under examination and passing along the line of sight through the transparent reflectors and sight aperture whereby specular reflection from the cornea and lenses in front of the cornea of an eye under observation, returning substantially along said line of sight, will be reduced and diffused light coming from the inside of said eye will be transmitted to the eye of an individual using said instrument when the instrument is supported in its normal operating position.

3. A diagnostic instrument which may be used in eye examination, said instrument having a head with a sight aperture portion for viewing the eye under examination, a transparent reflector supported on said head adjacent said sight aperture portion and with its reflecting surface lying in a plane so angularly disposed relative to the sight aperture portion as to afford a line of sight through said transparent reflector and sight aperture, a light source, means on said instrument for supporting the light source and for directing the light from said source to the reflecting surface at substantially the polarizing angle so that for the particular transparent medium used for said reflector the light will be polarized and will be directed substantially along the line of sight, the transparent reflector and sight aperture portion being supported so that the reflector will also function as analyzing means, the transparent reflector being positioned at the polarizing angle for the light reflected back from the eye under examination and passing along the line of sight through the transparent reflector and sight aperture whereby specular reflection from the cornea and lenses in front of the cornea of an eye under observation, returning substantially along said line of sight, will be reduced and diffused light coming from the inside of said eye will be transmitted to the eye of an individual using said instrument when the instrument is supported in its normal operating position and a polarizing device mounted on the head on the opposite side of the sight aperture portion from the transparent reflector for intercepting the line of sight between the reflector and the eye of the individual using said instrument.

4. A diagnostic instrument which may be used in eye examination, said instrument comprising a self-contained source of illumination, a head with a sight aperture portion for viewing the eye under examination during the use of said instrument, a transparent reflector supported on said head adjacent said sight aperture portion and with its reflective surface lying in a plane so angularly disposed relative to the sight aperture portion so as to afford a line of sight through said transparent reflector and sight aperture, a passageway extending sidewise relative to said source of illumination, a passageway angularly disposed relative to said first passageway and directed toward the transparent reflector, a light deflecting member located adjacent the point of intersection of said angularly disposed light passageways for receiving light coming from said source of illumination and for directing the light to the reflecting surface of the transparent reflector so that, for the particular transparent medium used for said reflector, the light will be polarized and will be directed substantially along the line of sight, the entire assembly being supported so that the reflector will also function as analyzing means whereby specular reflection from the cornea and lenses in front of the cornea of an eye under observation, returning substantially along said line of sight, will be reduced and diffused light coming from the inside of said eye will be transmitted to the eye of an individual using said instrument when the instrument is supported in its normal operating position.

EDGAR D. TILLYER.